(12) United States Patent
Fitzgibbon

(10) Patent No.: US 6,833,681 B2
(45) Date of Patent: Dec. 21, 2004

(54) BARRIER MOVEMENT CONTROL FOR MID-TRAVEL BARRIER MOVEMENT START

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/176,166

(22) Filed: Jun. 20, 2002

(65) Prior Publication Data

US 2003/0234628 A1 Dec. 25, 2003

(51) Int. Cl.$^7$ ................................................ E05F 5/04
(52) U.S. Cl. ........................ 318/286; 318/283; 318/452; 318/468; 318/470
(58) Field of Search ................................. 318/264–266, 318/283, 286, 445, 452, 466, 468, 470, 484, 489; 388/907.5, 921

(56) References Cited

U.S. PATENT DOCUMENTS

| | | | | |
|---|---|---|---|---|
| 4,338,553 A | * | 7/1982 | Scott, Jr. ...................... 318/266 |
| 4,383,206 A | * | 5/1983 | Matsuoka et al. ........... 318/445 |
| 4,401,929 A | * | 8/1983 | Odaka et al. ................ 318/466 |
| 5,151,638 A | * | 9/1992 | Beckerman .................. 318/434 |
| 5,278,480 A | * | 1/1994 | Murray ........................ 318/626 |
| RE37,784 E | * | 7/2002 | Fitzgibbon et al. .......... 318/466 |

\* cited by examiner

Primary Examiner—Bentsu Ro
(74) Attorney, Agent, or Firm—Fitch, Even, Tabin & Flannery

(57) ABSTRACT

Methods and apparatus for controlling an automatic barrier movement system, particularly for beginning movement of a barrier which has been stopped between an open and closed position of the barrier. The receipt of a barrier movement command will generally start movement of the barrier toward the open position, however, when predetermined conditions are met the barrier may be started in a direction determined by a preprogrammed algorithm. The predetermined conditions may include that the barrier has been stopped for less than 5 minutes and/or that the barrier was stopped in response to an obstruction during travel toward the open position. The preprogrammed algorithm may be to move the barrier toward the closed position or move the barrier in a direction determined from other sensed conditions.

14 Claims, 5 Drawing Sheets

BARRIER MOVEMENT CONTROL FOR MID-TRAVEL BARRIER MOVEMENT START

The present invention relates to safety systems for use with automated barrier movement arrangements.

Modern barrier movement systems, such as garage door controllers, generally comprises a motor which responds to move the barrier in preprogrammed ways in response to stimuli. The program is constructed to handle the normal situations relating to the barrier and its movement. For example, when a barrier has been stopped in mid-travel while moving in an opening direction, a subsequent command from a user may cause the barrier to move in a direction toward closing. Also, when a barrier is stopped in mid-travel while moving in a closing direction a subsequent user command may cause the barrier to move toward the open position. Other systems may be programmed to move the barrier toward the closed position when the door has been stopped in mid-travel and a user command is received, regardless of the direction of travel prior to stopping the door.

It may be desirable to always move a barrier stopped in mid-travel in the opening direction. In the case of a vertically moving garage door this results in moving the door upwardly. If all door system, regardless of manufacturer, respond in the same manner it is believed that users may more accurately predict motion of the barrier. In some cases, however, opening (upward) movement of a garage door might create problems. For example, when an upwardly moving door stops because of contact with the bumper or trailer hitch of a car, restarting the door in the upward direction does not solve the problem. Downward door movement would be desired in such situations and if such is denied by the previously mentioned attempt to standardize the direction of travel to always up, then the user may be forced to try to physically disengage the bumper and door. A need exists for an improved arrangement for starting a stopped barrier in an opening direction, but which avoids the above problem.

SUMMARY

The need is met and a technical advance is achieved in accordance with the present invention. When a barrier move command is received and the barrier was previously stopped between open and closed positions, the barrier will be moved toward the open position unless predetermined conditions are met. In accordance with an embodiment, a controller responds to a movement command by moving the barrier toward the open position unless the movement command occurs within a predetermined period of time after movement of the barrier was stopped. When the stop was performed in less than the predetermined period of time, previously, another barrier movement algorithm is performed. Such other algorithm may for example be to always move the barrier to the closed position or to move the barrier in a direction opposite to the direction in which it was moving when the stop occurred.

The performance of the other algorithm may depend on further conditions such as the direction of prior barrier travel and/or the cause of stopping the barrier movement. For example, closing movement of the barrier may be enabled only when the movement command is received within the predetermined period of time, the barrier was moving in the opening direction and the barrier is stopped because of a detected obstruction.

The predetermined period of time may be selected to be relatively short so that the performance of the other algorithm occurs only if the movement command is received within approximately 5 seconds to 5 minutes after stopping the barrier. Further, the performance of the other algorithm may depend on the source of the movement command. For example, the other algorithm may be performed only when the movement command originated from a fixed sender such as a wall mounted barrier controller.

DESCRIPTION

Figure 1:
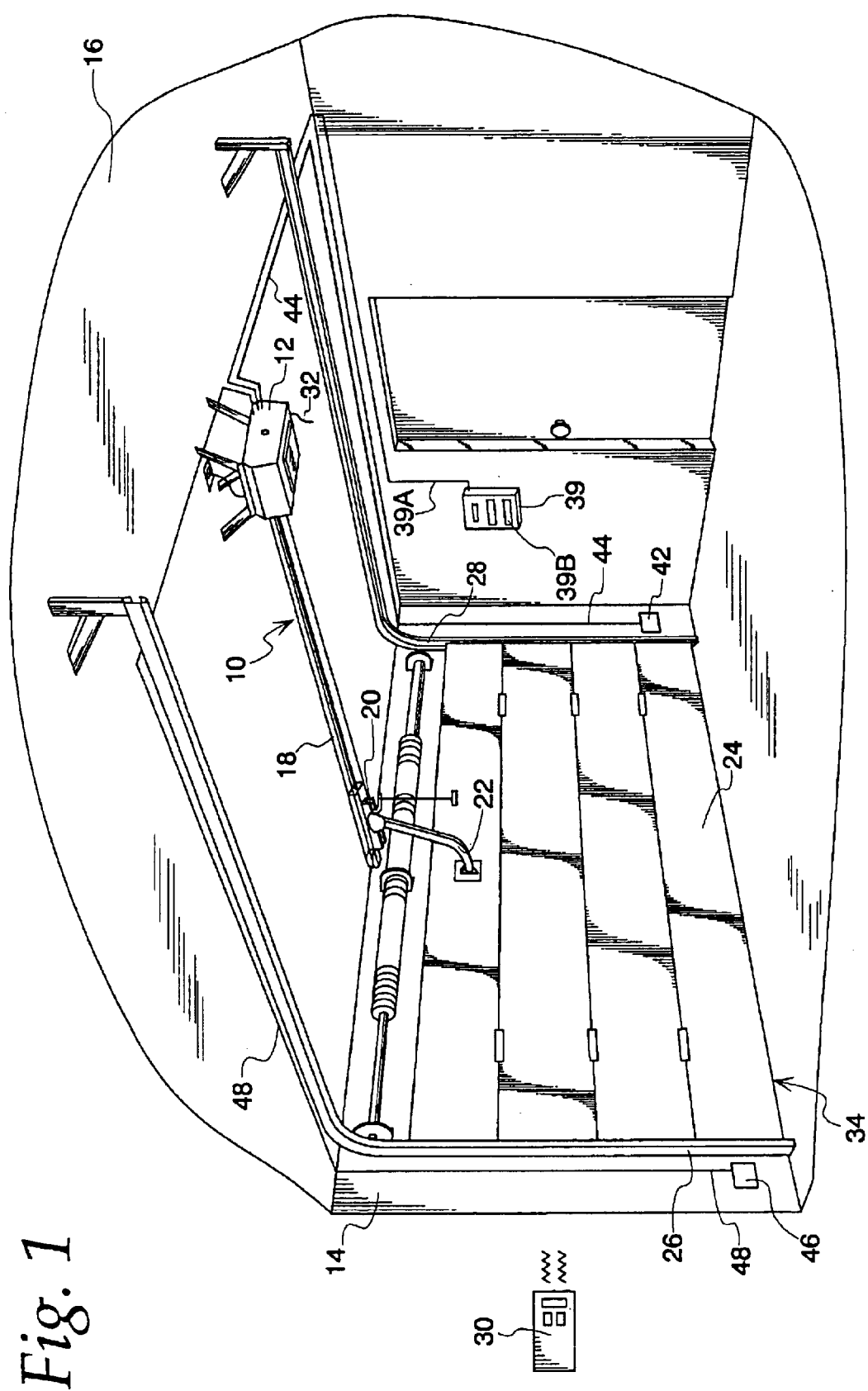
FIG. 1 is a perspective view of a barrier movement operator used to move a garage door.

Referring now to the drawings and especially to FIG. 1 a movable barrier operator or garage door opener is generally shown therein and referred to by numeral 10. The operator includes a head unit 12 mounted within a garage 14. More specifically, the head unit 12 mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send rf coded command signals to an antenna 32 positioned on the head unit 12 and coupled to a rf receiver of the head end. A switch module 39 is mounted on a wall of the garage. The wall control module 39 is wire connected to the head unit by a pair of wires 39a. In other embodiments the wall control may communicate with the head end via rf. The wall control module 39 includes a command switch 39b, which may be pressed by a user to operate door control commands. An optical emitter 42 is connected via a power and signal line 44 to the head unit. An optical detector 46 is connected via a wire 48 to the head unit 12. The optical emitter 42 and detector watch, the door opening to identify possible obstructions to door travel.

Figure 2:
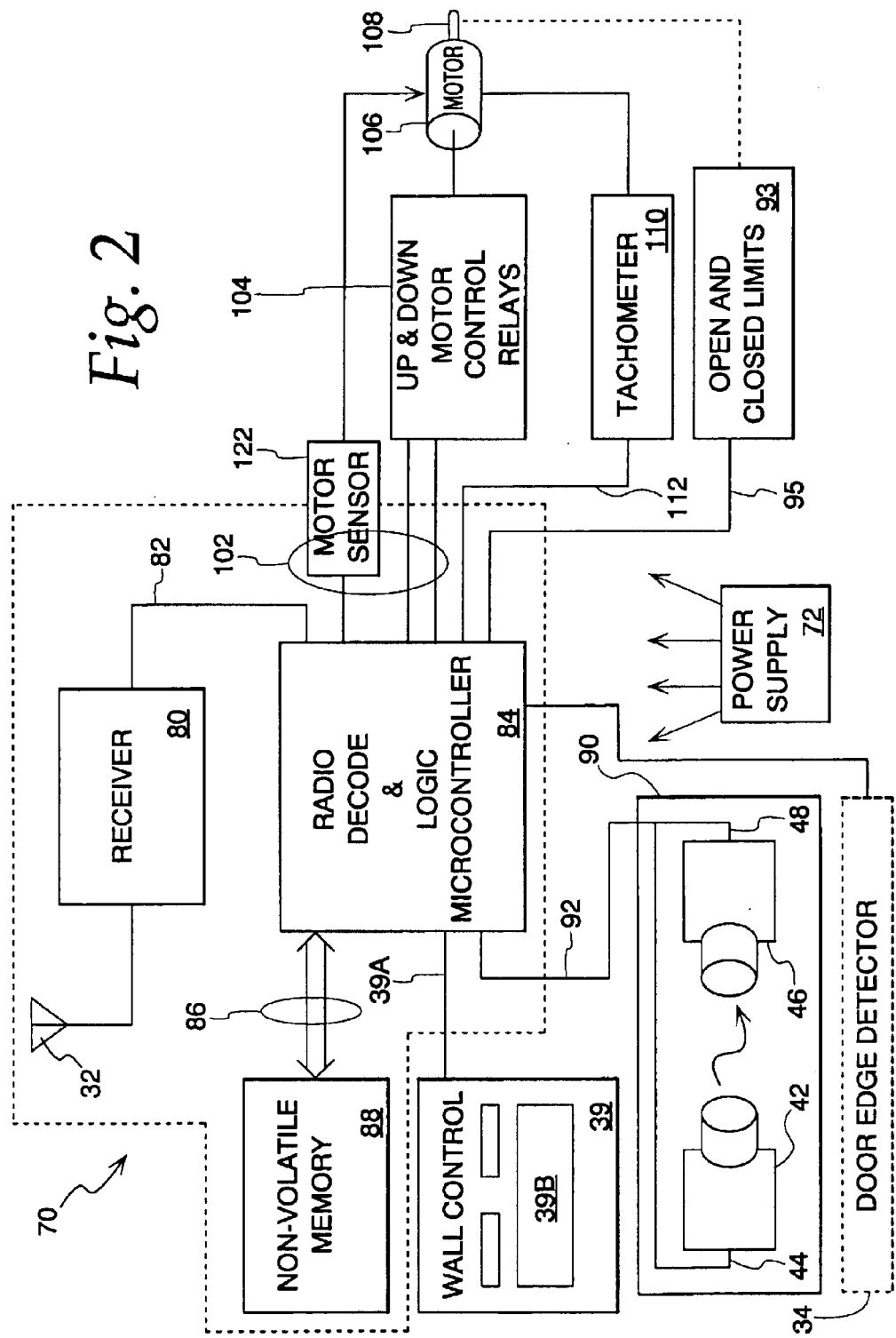
FIG. 2 is an electrical block diagram of the barrier movement operator.

As shown in FIG. 2, the garage door operator 10, which includes the head unit 12 has a controller 70 which includes the antenna 32. The controller 70 includes a power supply 72 which receives alternating current from an alternating current source, such as 110 volt AC, and converts the alternating current to required levels of DC voltage. The controller 70 includes rf receiver 80 coupled via a line 82 to supply demodulated digital signals to a micro-controller 84. The receiver 80 is energized by the power supply 72. The micro-controller is also coupled by a bus 86 to a non-volatile memory 88, which non-volatile memory stores user codes, and other digital data related to the operation of the control unit. An optical detector 90, which comprises the emitter 42 and infrared detector 46 is coupled via an obstacle detector bus 92 to the micro-controller 84. The obstacle detector bus 92 includes lines 44 and 48. In other embodiments the optical detector 90 may utilize other sensing capabilities such as high frequency sound. The embodiment may also include an optional door edge detector 34 to detect physical contact of the door with an obstruction in the door's path (the opening). The wall switch 39 is connected via the connecting wires 39a to the micro-controller 84. The micro-controller 84, in response to switch closures and received rf codes, will send signals over a relay logic line 102 to a relay logic module 104 connected to an electric motor 106 having a power take-off shaft 108 coupled to the trolley 20 to raise (open) and lower (close) the door 24. A tachometer 110 is coupled to the shaft 108 and provides motor rotation signals on a tachometer line 112 to the micro-controller 84; the tachometer signal being indicative of the speed of rotation of the motor. The apparatus also includes up limit switches and down limit switches which respectively sense when the door 24 is fully open or fully closed. The limit switches are shown in FIG. 2 as a functional box 93 connected to micro-controller 84 by leads 95. Door open and closed limits may also be detected internally by micro-controller 84 by counters which reflect door movement from the motor rotation signals on conductor 112. Additionally, the arrangement of FIG. 2 may include a motor power or current sensor 122 connected to micro-controller 84. Motor sensor senses the power and/or current used by motor 106 and generates an obstruction signal when a threshold is exceeded.

Figure 3:
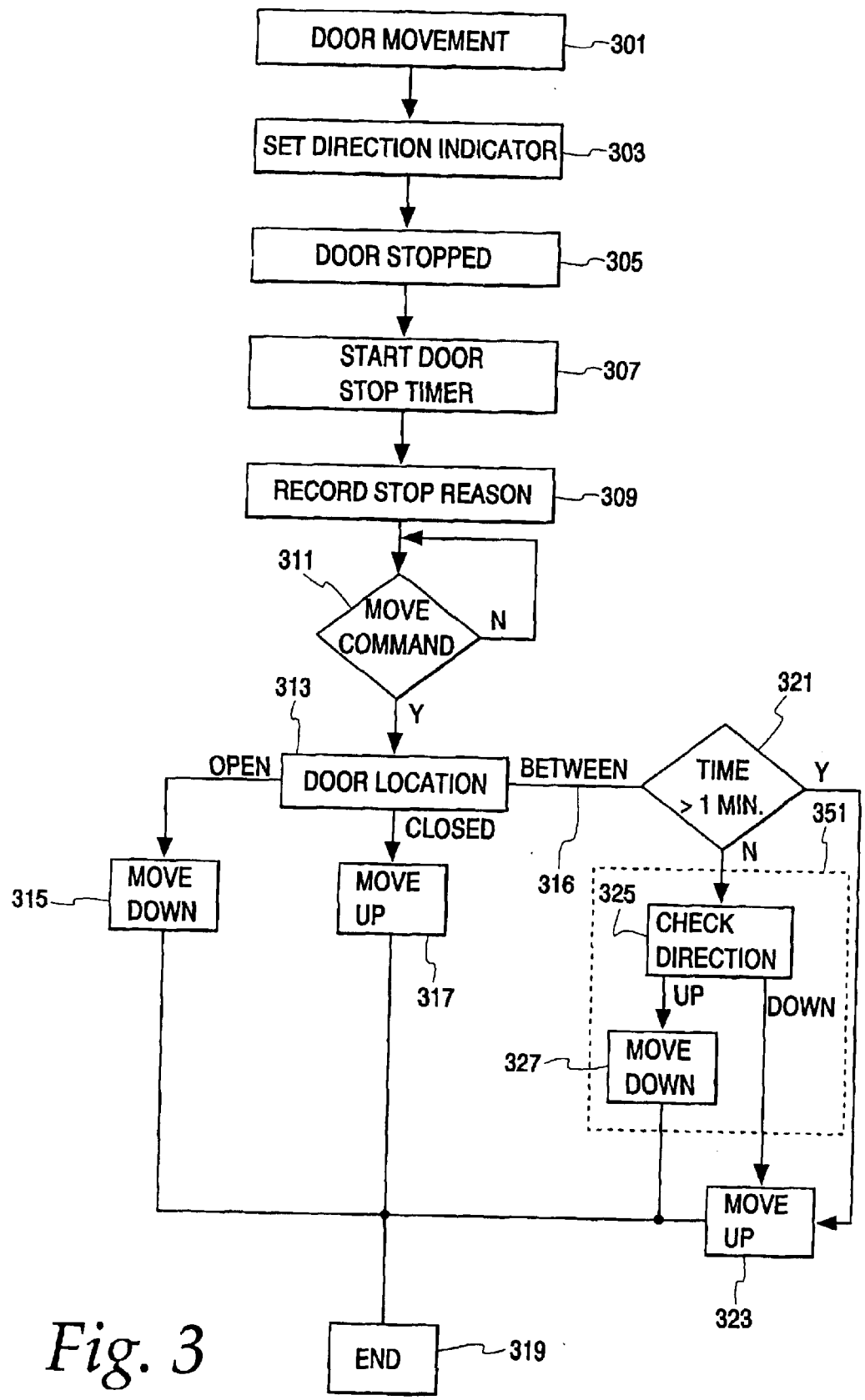
FIG. 3 is a flow diagram of a first embodiment of barrier movement control.
Figure 4B:
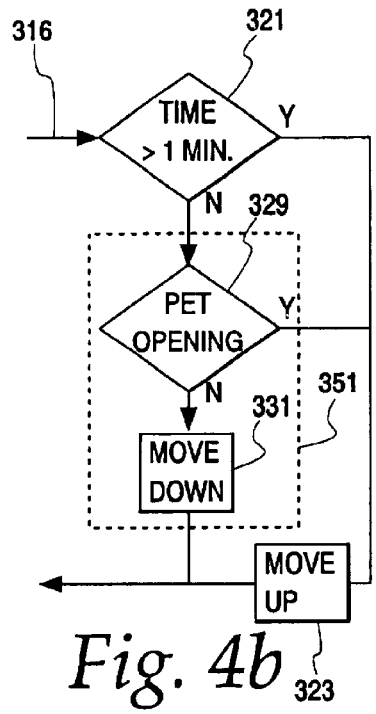
FIGS. 4a and 4b represent possible modifications of the flow diagram of FIG. 3.
Figure 4A:
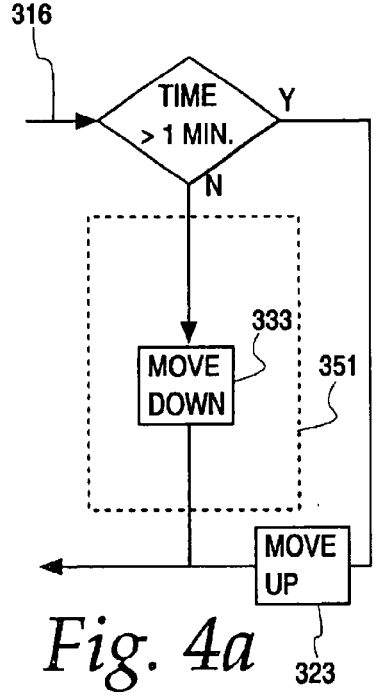
Figure 6:
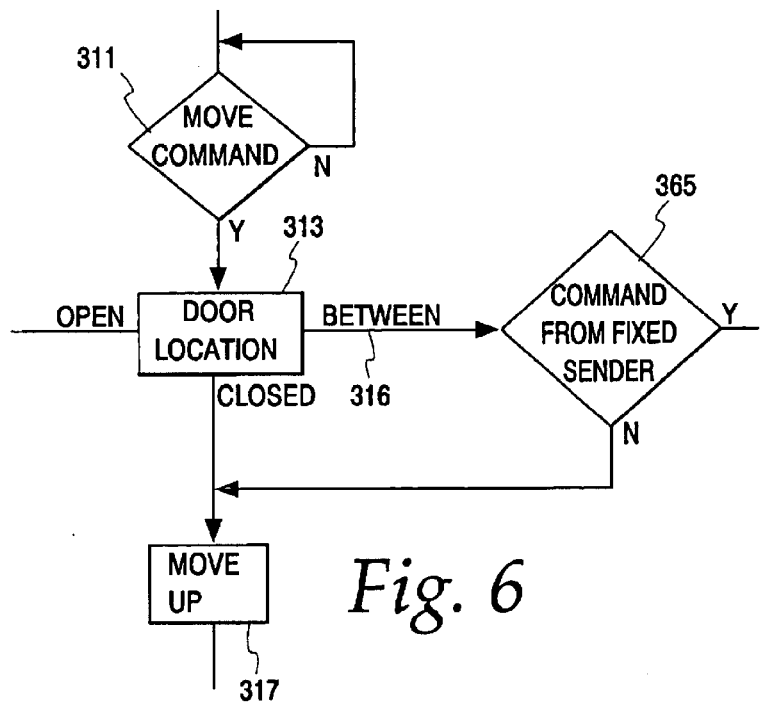
FIG. 6 is a partial flow diagram to limit closing door movement to commands from fixed senders.
Figure 5:
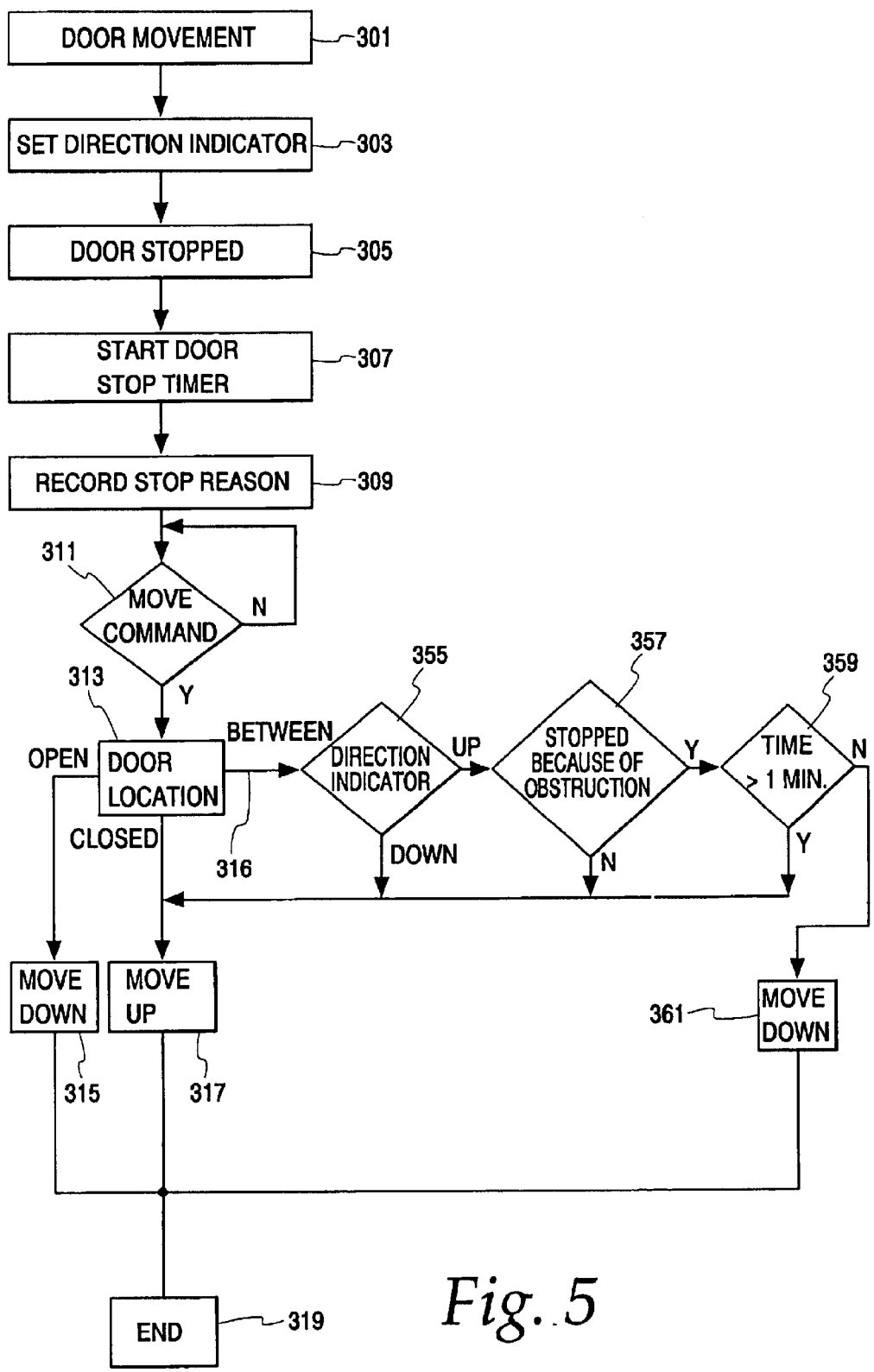
FIG. 5 is a flow diagram of a second embodiment of barrier movement control.

FIG. 3 is a functional flow diagram of an embodiment of barrier movement control as it relates to beginning movement of a stopped barrier. The specific barrier in this embodiment and that of FIGS. 4, 5 and 6 is a vertically moving garage door. As will be readily apparent the teaching of the embodiments applies to any barrier movement system where the barrier is moved between an open position and a closed position.

Block 301 represents a fact that the door is moving and a block 303 represents the storage of an indication of the direction of door movement. Next a block 305 is performed in which the door movement is stopped. Such may occur because of user interaction, because the door has contacted an obstruction, because the door has achieved the full open or closed position or because of many other reasons programmed into known barrier movement arrangements. After the door is stopped a timer is started in block 307 and the reason for stopping the door is recorded in block 309. The door will remain stopped until a move command is detected in a decision block 311. A move command may for example, be received because of user interaction with an rf transmitter 30 or wall control 39, as is known in barrier movement systems.

Next a block 313 is performed to determine the then current position of the door. When the door is in the full open position a block 315 is performed to begin downward movement toward the closed position. When block 313 detects the door to be fully closed a block 317 is performed to move the door upwardly toward the open position. It should again be noted that the present embodiment specifically discusses a vertically moving door while it should be apparent that the arrangement also applies to other systems such as horizontally sliding or rotating gates or doors.

When block 313 determines that the door has stopped between the open and closed positions flow proceeds along a path 316 and a block 321 is performed in which the value of the timer started in block 307 is compared to a predetermined value. In the present embodiment the value for comparison is one minute, however such value would normally be between 5 seconds to 5 minutes. The predetermined time value is generally selected to represent a short time period during which it is likely that a person who initiated a prior motion or the stopping thereof is still near the door being controlled.

When the stop time exceeds the predetermined value e.g., 1 minute, flow proceeds to block 323 where the door is moved upwardly toward the open position. When the stop time value is not greater than 1 minute flow proceeds from decision block 321 to block 325 where the door direction value set in block 303 is checked. If the direction value indicates the door was moving down before it was stopped then flow proceeds to block 323 where upward (opening) movement of the door is started. When block 325 detects that the door was moving up when stopped then a block 327 is performed to begin downward movement of the door.

FIG. 3 includes a dotted box 351 surrounding blocks 325 and 327. Dotted box 351 represents a "normal" algorithm which may be preprogrammed into the system controller. The result of the "normal" algorithm shown in FIG. 3 is that the movement of the door will be reversed when starting within 1 minute after stopping between the open and closed positions. Other algorithms, as shown in FIGS. 4a and 4b, may also be provided in substitution for those shown in FIG. 3. FIG. 4a represents an algorithm in which the door will always be moved downwardly (toward closing) when started within the predetermined period of time after being stopped. In FIG. 4a flow proceeds from time decision block 321 to a move down block 333 regardless of other conditions. FIG. 4b represents a situation in which the door has been stopped by exercising a special command to allow an opening for a pet to enter and leave a garage. In FIG. 4b, when a move command has been received less than the predetermined time after the door was stopped flow proceeds to a decision block 329 to determine whether the door stopped as a result of the special pet opening command. When block 329 determines that the pet opening command was used flow proceeds to the move up command. Alternately, when block 329 determines that some other reason exists for stopping the door, flow proceeds to block 331 which moves the door in the downward (closing) direction.

FIG. 5 is a flow diagram of another embodiment in which the direction of door travel when the stop occurs is considered when a move command is received. In FIG. 5 blocks 301 through 319 are performed as described above with regard to FIG. 3. When block 313 determines that the door is stopped between open and closed positions flow proceeds along flow path 316 to decision block 355 which checks the direction of door movement as stored by the indicator set in block 303. When block 355 identifies that the door was moving in the closing (downward) direction, flow proceeds to block 317 where the door is moved in the opening (upward) direction. Because it is unlikely that further downward movement will improve a situation which may have stopped a downward moving door, block 355 always directs the door upwardly when it was moving down.

When block 355 determines that the door was moving in the upward direction flow proceeds to decision block 357 which checks the reason for stopping stored in block 309 to identify whether the door stopped due to an obstruction. When the door stopped for a reason other than an obstruction flow proceeds to block 317 where the door is moved up. Alternatively, when block determines that an obstruction caused door stoppage flow proceeds to block 359 to determine whether the door has been stopped for one minute or less. When block 359 determines that the door has been stopped for longer than the 1 minute predetermined time, flow proceeds to block 317 where the door is moved upwardly. On the other hand, when decision block 359 determines that the door has been stopped for one minute or less flow proceeds to block 361 to move the door in the downward (closing) direction. In FIG. 5 blocks 355, 357 and 359 are arranged in numerical order. The order may easily be rearranged, provided that the move down block 361 is entered when all conditions are met and the move up block 317 is entered if any condition is not met.

In the proceeding embodiments any user generated move command detected in block 311 enables the subsequent actions of the barrier movement system. It may be desirable to allow downward or closing movement of the door starting from a mid-travel position only when it is likely that the user can see the door being moved. FIG. 6 shows an embodiment which limits downward movement of a door started from mid-travel to those situations where the move command is received from a fixed sender such as wall control 39 or a wireless control (not shown) which is attached in such a position that the doorway can be seen. FIG. 6 represents only a partial flow diagram and may be used in the flow sequence of all of the above described embodiments by insertion into flow line 316. In the embodiment of FIG. 6, when a mid-travel starting point is detected by block 313 flow proceeds to block 365 which identifies whether the move command originated from a fixed sender. When the move command originated from a fixed sender, flow proceeds to further tests such as block 355 of FIG. 5 or block 321 of FIG. 3 to determine whether the door should be moved downwardly. Alternatively, when the move command did not originate from a fixed sender, but from a sender such as hand held transmitter 30 flow proceeds to the move up block 317.

While there has been illustrated and described particular embodiments, it will be appreciated that numerous changes and modifications will occur to those skilled in the art, and it is intended in the appended claims to cover all those changes and modifications which fall within the true spirit and scope of the present invention.

What is claimed is:

1. A method of controlling a barrier movement system, to move a barrier between open and closed positions, the method comprising:

stopping barrier movement;

timing the time period during which the barrier is stopped;

receiving a movement command to move the barrier;

identifying when the barrier is stopped between open and closed positions;

responsive to the movement command, open moving the barrier toward the open position when the timing step indicates that the barrier has been stopped for more than a predetermined period of time;

responsive to the movement command, close moving the barrier according to a predetermined algorithm when the timing step indicates that the barrier has been stopped for less than the predetermined period of time.

2. The method of claim 1 wherein the predetermined period of time is in the range of 5 to 300 seconds.

3. The method of claim 1 wherein the barrier moves in an upward direction toward the open position and in a downward direction toward the closed position.

4. The method of claim 1 wherein the predetermined algorithm responds to the movement command by moving the barrier toward the closed position.

5. The method of claim 1 comprising direction identifying the direction of movement of the barrier prior to stopping the barrier and the predetermined algorithm responds to the movement command by moving the barrier toward the closed position when the direction identifying step identifies movement toward the open position.

6. The method of claim 1 comprising direction identifying the direction of movement of the barrier prior to stopping the barrier and the predetermined algorithm responds to the movement command by moving the barrier toward the open position when the direction identifying step identifies movement toward the closed position.

7. The method of claim 1 comprising source identifying the source of the movement command, inhibiting the performance of the close moving step and enabling the performance of the open moving step when the source of the movement command is not a fixed sender.

8. A method of controlling a barrier movement system to move a barrier between open and closed positions, the method comprising:

detecting obstructions to barrier movement;

stopping barrier movement;

receiving a barrier movement command after the stopping step;

responsive to the receiving step, close moving the barrier toward the closed position when the stopping step is performed in response to the detection of an obstruction; and responsive to the receiving step, open moving the barrier toward the open position when the stopping step is not performed in response to the detection of an obstruction.

9. The method of claim 8 wherein the barrier moves in an upward direction toward the open position and a downward direction toward the closed position.

10. The method of claim 8 comprising:

timing the period of time after the stopping step; and inhibiting the performance of the close moving step when the door has been stopped for more than a predetermined period of time.

11. The method of claim 10 comprising:

performing the open moving step regardless of the cause of stopping when the door has been stopped for more than the predetermined period of time.

12. The method of claim 11 wherein the predetermined period of time is in the range of 5 to 300 seconds.

13. The method of claim 8 comprising source identifying the source of the movement command, inhibiting the performance of the close moving step and enabling the performance of the open moving step when the source of the movement command is not a fixed sender.

14. A method of controlling a barrier movement system, to move a barrier between open and closed positions, the method comprising:

detecting obstructions to barrier movement;

stopping barrier movement;

receiving a barrier movement command after the stopping step;

responsive to the receiving step, the direction of travel is conditional on the previous operation stopping, being generated by an obstruction.

* * * * *